United States Patent
Kim

(12) 
(10) Patent No.: US 10,612,417 B2
(45) Date of Patent: Apr. 7, 2020

(54) GAS TURBINE ROTOR HAVING STRUCTURE FOR ADJUSTING AXIAL CLEARANCE, AND GAS TURBINE HAVING SAME

(71) Applicant: DOOSAN HEAVY INDUSTRIES & CONSTRUCTION CO., LTD., Changwon-si, Gyeongsangnam-do (KR)

(72) Inventor: Kibaek Kim, Changwon-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 235 days.

(21) Appl. No.: 15/714,126

(22) Filed: Sep. 25, 2017

(65) Prior Publication Data
US 2018/0313229 A1 Nov. 1, 2018

(30) Foreign Application Priority Data

Apr. 28, 2017 (KR) .......................... 10-2017-0055165

(51) Int. Cl.
*F01D 25/24* (2006.01)
*F01D 5/06* (2006.01)
*F01D 25/14* (2006.01)

(52) U.S. Cl.
CPC ............ *F01D 25/243* (2013.01); *F01D 5/06* (2013.01); *F01D 5/066* (2013.01); *F01D 25/14* (2013.01);
(Continued)

(58) Field of Classification Search
CPC .... F01D 5/066; F01D 5/06; F16C 3/12; F16C 3/023; F16C 2202/22; F16D 1/02;
(Continued)

(56) References Cited

U.S. PATENT DOCUMENTS 3,304,052 A * 2/1967 Warner ................... F01D 5/025
  416/215
3,597,110 A * 8/1971 Corsmeier ............. F01D 5/066
  416/198 R
(Continued)

FOREIGN PATENT DOCUMENTS

DE 833101 C * 3/1952 ............. F01D 5/066
EP 1193370 A2 4/2002
(Continued)

OTHER PUBLICATIONS

European Search Report dated Apr. 23, 2018 in European Application No. 17192933.4.
(Continued)

*Primary Examiner* — Kenneth J Hansen
*Assistant Examiner* — Maranatha Boardman
(74) *Attorney, Agent, or Firm* — Invenstone Patent, LLC

(57) ABSTRACT

A gas turbine rotor includes: a first rotor in a shaft shape extending by a predetermined length in an axial direction, and provided with an insertion hole at an end of the first rotor; a second rotor in a shaft shape extending by a predetermined length in the axial direction, and provided with an insertion part extending by a predetermined length at an end of the second rotor and corresponding to the insertion hole such that the insertion part is inserted into the insertion hole; and a connecting member mounted between the insertion hole and the insertion part to connect the first rotor and the second rotor together, and made of a material having a thermal expansion coefficient different from a thermal expansion coefficient of both the first rotor and the second rotor.

17 Claims, 9 Drawing Sheets

(52) U.S. Cl.
CPC ...... *F05D 2230/60* (2013.01); *F05D 2240/60* (2013.01)

(58) Field of Classification Search
CPC . F16L 19/0206; F16L 21/002; F16L 25/0018; F16L 25/10; F16L 25/12; Y10T 403/21; Y10T 403/213; Y10T 403/217; F16B 2001/0078
See application file for complete search history.

(56) References Cited

U.S. PATENT DOCUMENTS

| | | | | |
|---|---|---|---|---|
| 4,478,593 A | * | 10/1984 | Brown | F02B 61/06 192/112 |
| 4,577,871 A | | 3/1986 | Weghaupt et al. | |
| 4,980,241 A | * | 12/1990 | Hoffmueller | F01D 5/066 277/345 |
| 5,203,441 A | * | 4/1993 | Monette | F02B 61/06 192/112 |
| 9,701,386 B2 | * | 7/2017 | Marovic | F16C 3/026 |
| 2011/0070069 A1 | | 3/2011 | Zheng et al. | |
| 2017/0114643 A1 | * | 4/2017 | Kolk | F04D 19/007 |

FOREIGN PATENT DOCUMENTS

| | | | | |
|---|---|---|---|---|
| GB | 603996 A | * | 6/1948 | ............ F01D 5/063 |
| JP | S57-69116 A | | 4/1982 | |
| JP | S58-201040 A | | 11/1983 | |
| JP | S59-169480 U | | 11/1984 | |
| JP | S60-204255 A | | 10/1985 | |
| JP | S63-1890 A | | 1/1988 | |
| JP | 2011-122589 A | | 6/2011 | |
| KR | 10-2008-0088473 A | | 10/2008 | |
| KR | 10-1539876 | | 7/2015 | |
| KR | 10-2017-0015248 A | | 2/2017 | |
| WO | WO-2013/104880 A1 | | 7/2013 | |

OTHER PUBLICATIONS

Office Action dated Mar. 28, 2018 in Korean Application No. 10-2017-0055165.

Office Action dated Jul. 31, 2018 in Japanese Application No. 2017-180277.

* cited by examiner

Prior Art

GAS TURBINE ROTOR HAVING STRUCTURE FOR ADJUSTING AXIAL CLEARANCE, AND GAS TURBINE HAVING SAME

CROSS REFERENCE TO RELATED APPLICATION

The present application claims priority to Korean Patent Application No. 10-2017-0055165, filed Apr. 28, 2017, the entire contents of which is incorporated herein for all purposes by this reference.

BACKGROUND OF THE DISCLOSURE

Field of the Disclosure

The present disclosure relates generally to a gas turbine rotor, and a gas turbine having the same. More particularly, the present disclosure relates to a gas turbine rotor having a structure for adjusting axial clearance, and a gas turbine having the same.

Description of the Background Art

Generally, a gas turbine 1 includes a compressor 11, a combustor 12, and a turbine 13. The air introduced through an air inlet 20 is compressed by the compressor 11 into high temperature and high pressure compressed air and the combustor 12 supplies fuel to the compressed air to combust the mixture of the fuel and the compressed air, thereby obtaining high temperature and high pressure combustion gas (working fluid), whereby the turbine 13 is driven by the combustion gas, and a generator connected to the gas turbine 1 is driven.

Generally, a gas turbine engine is a kind of rotary internal combustion engine that rotates the turbine to obtain torque by the expansion of high temperature and high pressure combustion gas.

In other words, the air with increased pressure while passing through the compressor is supplied to the combustion chamber, then the compressed air is mixed with fuel to become high temperature gas at 800° C. to 1200° C. in the combustion chamber, and then the gas expands in the turbine up to a pressure ratio at which the required output of the compressor can be obtained, whereby a generator is rotated by using an output of the rotating turbine, and further, the high temperature combustion gas discharged from the turbine may be used for the combined cycle power generation. Gas turbine engines for an aircraft may obtain propulsion by ejecting gas discharged from the turbine at high speed through a jet nozzle.

The compressor and turbine constituting the gas turbine includes vanes and blades, respectively. The blades, as a rotating body, are rotated together by a rotor connected by one shaft. In other words, some of the rotational power of the turbine is used as the driving power of the compressor.

As shown in FIG. 1, in the case of a conventional gas turbine, it should be manufactured and operated very precisely. In particular, in the case of a gas turbine rotor, at the starting phase of the gas turbine, the axial length gradually changes due to thermal expansion. Most of the gas turbines so far have not been equipped with a device to adjust the axial clearance of the rotor, so the positions of the vanes and blades are changed according to changes in the axial length of the gas turbine rotor, and the changes in the vanes and blades positions cause changes in aerodynamic characteristics. As a result, the output and efficiency of the entire gas turbine are changed.

Accordingly, a technique for a gas turbine rotor is required to solve the above problems occurring in the background art.

The foregoing is intended merely to aid in the understanding of the background of the present disclosure, and is not intended to mean that the present disclosure falls within the purview of the background art that is already known to those skilled in the art.

Documents of Related Art (Patent Document 1) Korean Patent No. 10-1539876 (Jul. 21, 2015)

SUMMARY OF THE DISCLOSURE

Accordingly, the present invention has been made keeping in mind the above problems occurring in the related art, and the present invention is intended to propose a gas turbine rotor and a gas turbine having the same, in which an axial length of the gas turbine rotor is adjusted at a starting phase of the gas turbine to adjust a radial clearance of the turbine.

According to some aspects of the present disclosure, a gas turbine rotor rotating with a compressor and a turbine blade mounted to an outer circumferential surface thereof, comprises: a first rotor formed in a shaft shape extending by a predetermined length in an direction, and provided with an insertion hole at an end of the first rotor; a second rotor formed in a shaft shape extending by a predetermined length in the axial direction, and provided with an insertion part extending by a predetermined length at an end of the second rotor and corresponding to the insertion hole provided in the first rotor such that the insertion part is inserted into the insertion hole; and a connecting member mounted between the insertion hole and the insertion part to connect the first rotor and the second rotor together, and made of a material having a thermal expansion coefficient different from a thermal expansion coefficient of both the first rotor and the second rotor.

In an embodiment of the present disclosure, the first rotor may be provided with bolt holes at the end thereof along an outer circumferential surface to be spaced apart from each other at predetermined intervals, the connecting member may be provided with through-holes at locations on a side surface thereof corresponding to the bolt holes, with the end of the first rotor coupled thereto, and the first rotor and the connecting member may be bolted to each other by using the bolt holes and the through-holes.

In an embodiment of the present disclosure, the insertion part may be provided with bolt holes at an end thereof along an outer circumferential surface to be spaced apart from each other at predetermined intervals, the connecting member may be provided with through-holes at locations on a side surface thereof corresponding to the bolt holes, with the end of the insertion part coupled thereto, and the second rotor and the connecting member may be bolted to each other by using the bolt holes and the through-holes.

In an embodiment of the present disclosure, the connecting member may be configured such that at least two materials having different thermal expansion coefficients are arranged in a predetermined pattern.

In an embodiment of the present disclosure, the connecting member may includes: a first connecting part coupled to the end of the first rotor; a second connecting part coupled to the end of the second rotor; and an extension part integrally connecting the first connecting part and the second connecting part to each other, and having a structure corresponding to an outer circumferential surface of the insertion part by extending by a predetermined length.

Further, an interval between an inner circumferential surface of the insertion hole and the outer circumferential surface of the insertion part may range from 100% to 110% of a thickness of the extension part.

Further, the connecting member may have a cross-section in an annular shape having an outer diameter corresponding to outer diameters of the first rotor and the second rotor.

In an embodiment of the present disclosure, the connecting member may be configured such that at least two connecting members are connected to each other to have a cross-section in an annular shape corresponding to outer diameters of the first rotor and the second rotor.

In an embodiment of the present disclosure, the extension part may be configured such that at least two materials having different thermal expansion coefficients are arranged in a predetermined pattern.

In an embodiment of the present disclosure, both a contact surface between the first rotor and the connecting member and a contact surface between the second rotor and the connecting member may be coated with a heat transfer material.

In an embodiment of the present disclosure, each of the first rotor and the second rotor may be provided with a first passage therein to allow cooling fluid to flow therethrough.

Further, the connecting member may be provided therein with a second passage communicating with the first passage.

Further, the second passage may be provided in a direction parallel to an extension direction of the connecting member.

Further, the second passage may be provided in plural to be spaced apart from each other at predetermined intervals.

According to some aspects of the present disclosure, a gas turbine includes a compressor; a gas turbine rotor rotating with the compressor; and a gas turbine blade mounted to an outer circumferential surface of the gas turbine rotor. The gas turbine rotor includes: a first rotor formed in a shaft shape extending by a predetermined length in an axial direction, and provided with an insertion hole at an end of the first rotor; a second rotor formed in a shaft shape extending by a predetermined length in the axial direction, and provided with an insertion part extending by a predetermined length at an end of the second rotor and corresponding to the insertion hole provided in the first rotor such that the insertion part is inserted into the insertion hole; and a connecting member mounted between the insertion hole and the insertion part to connect the first rotor and the second rotor together, and made of a material having a thermal expansion coefficient different from a thermal expansion coefficient of both the first rotor and the second rotor.

In an embodiment of the present disclosure, the connecting member may include: a first connecting part coupled to the end of the first rotor; a second connecting part coupled to the end of the second rotor; and an extension part integrally connecting the first connecting part and the second connecting part to each other, and having a structure corresponding to an outer circumferential surface of the insertion part by extending by a predetermined length.

In an embodiment of the present disclosure, the connecting member may have a cross-section in an annular shape having an outer diameter corresponding to outer diameters of the first rotor and the second rotor.

In an embodiment of the present disclosure, the connecting member may be configured such that at least two materials having different thermal expansion coefficients are arranged in a predetermined pattern.

In an embodiment of the present disclosure, the connecting member may be configured such that at least two connecting members are connected to each other to have a cross-section in an annular shape corresponding to outer diameters of the first rotor and the second rotor.

As described above, according to the gas turbine rotor of the present disclosure, since it is provided with a first rotor, a second rotor, and a connecting member having predetermined structures, it is possible to provide a gas turbine rotor and a gas turbine having the same, in which an axial length of the gas turbine rotor is adjusted at a starting phase of the gas turbine to adjust a radial clearance of the turbine.

Further, according to the gas turbine rotor of the present disclosure, since the connecting member is firmly and stably bolted to both the first rotor and the second rotor by using bolt holes formed at ends of the first rotor and the second rotor, and through-holes formed in the connecting member, it is possible to achieve a gas turbine rotor with a stable structure.

Further, according to the gas turbine rotor of the present disclosure, since the connecting member is made of a material having a thermal expansion coefficient different from a thermal expansion coefficient of both the first rotor and the second rotor, it is possible to provide a gas turbine rotor and a gas turbine having the same, in which the axial length of the gas turbine rotor is adjusted according to the temperature rise of the gas turbine rotor at the starting phase of the gas turbine, thereby adjusting a radial clearance of the turbine.

Further, according to the gas turbine rotor of the present disclosure, since the connecting member is made of at least two materials having different thermal expansion coefficients according to purpose and order, it is possible to provide a gas turbine rotor and a gas turbine having the same, in which the axial length of the gas turbine rotor is adjusted according to the temperature rise of the gas turbine rotor at the starting phase of the gas turbine, thereby adjusting a radial clearance of the turbine.

Further, according to the gas turbine rotor of the present disclosure, since an interval between an inner circumferential surface of the insertion hole and the outer circumferential surface of the insertion part is limited to a predetermined range relative to the thickness of the extension part, it is possible to more precisely and reliably adjust the entire length of the gas turbine rotor according to the thermal deformation of the connecting member.

Further, according to the gas turbine rotor of the present disclosure, since it is provided with a first passage and a second passage having predetermined structures, such that the cooling air flows through the first passage and the second passage, it is possible to easily adjust the axial length of the first rotor, the second rotor, and the connecting member according to the thermal deformation.

Further, according to the gas turbine of the present disclosure, since it is provided with a gas turbine rotor having a predetermined structure, it is possible to provide a gas turbine rotor and a gas turbine having the same, in which the axial length of the gas turbine rotor is adjusted according to the temperature rise of the gas turbine rotor at the starting phase of the gas turbine, thereby adjusting a radial clearance of the turbine.

BRIEF DESCRIPTION OF THE DRAWINGS

The above and other features of the present disclosure will be more clearly understood from the following detailed description when taken in conjunction with the accompanying drawings, in which.

DETAILED DESCRIPTION OF THE DISCLOSURE

Reference will now be made in detail to preferred embodiments of the present disclosure with reference to the accompanying drawings. Before describing, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout the specification, when a member is "on" another member, it includes not only when a member is in contact with another member, but also when there is another member between the two members. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
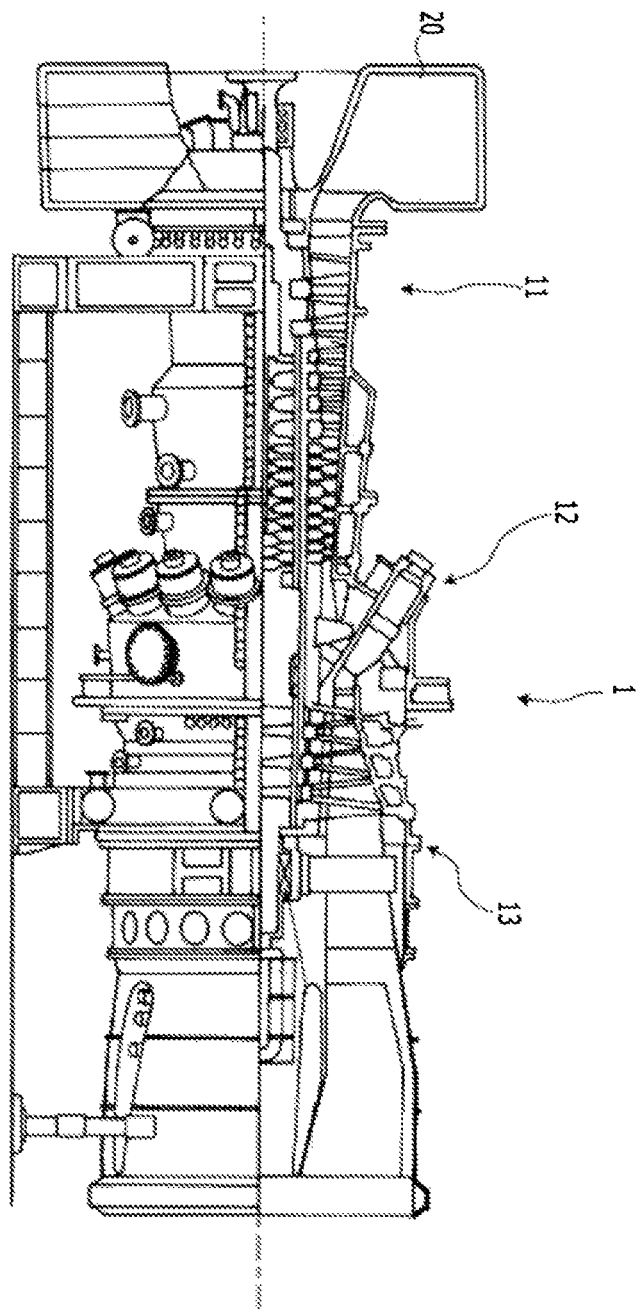
FIG. 1 is a front view showing a gas turbine according to the related art.
Figure 2:
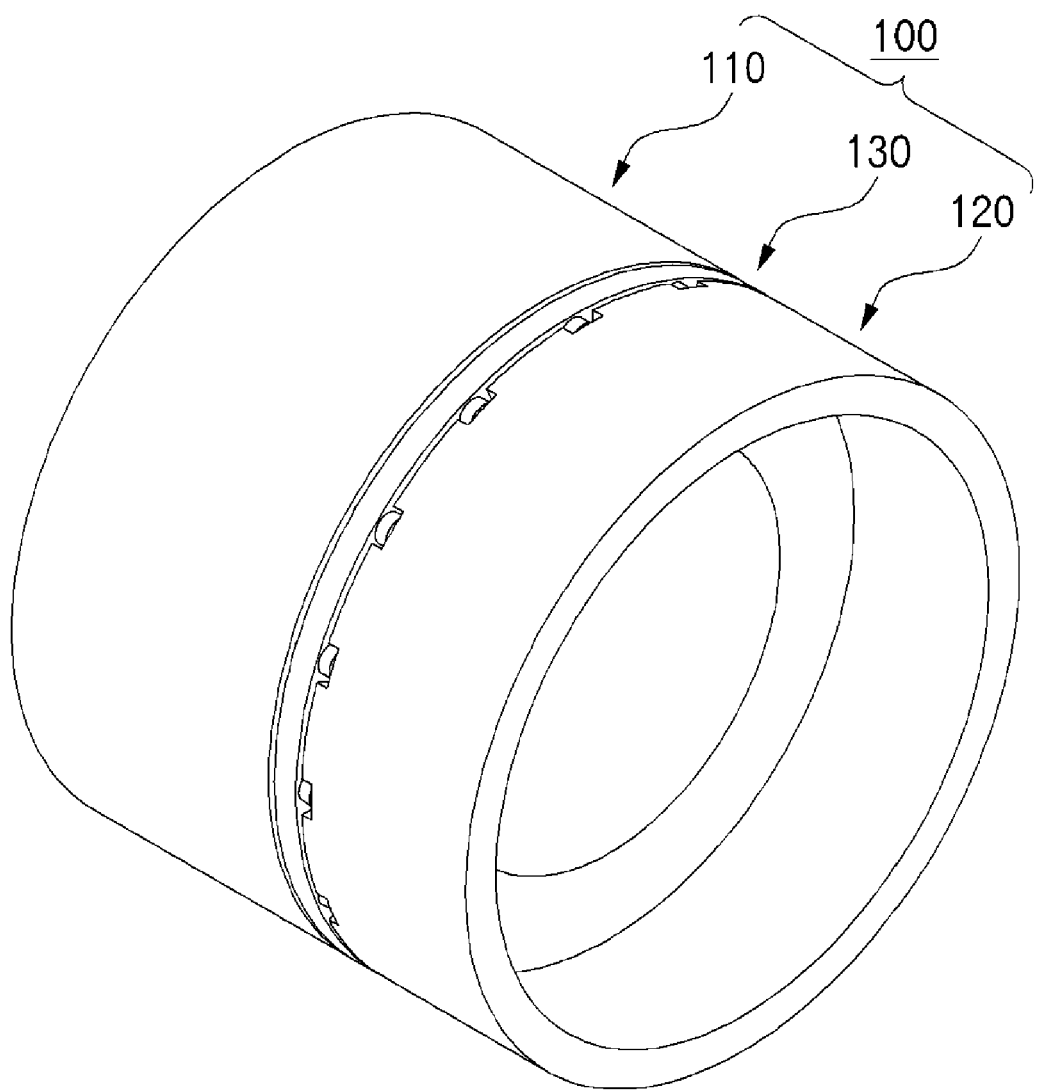
FIG. 2 is a sectional view partially showing a gas turbine rotor according to an embodiment of the present disclosure.
Figure 3:
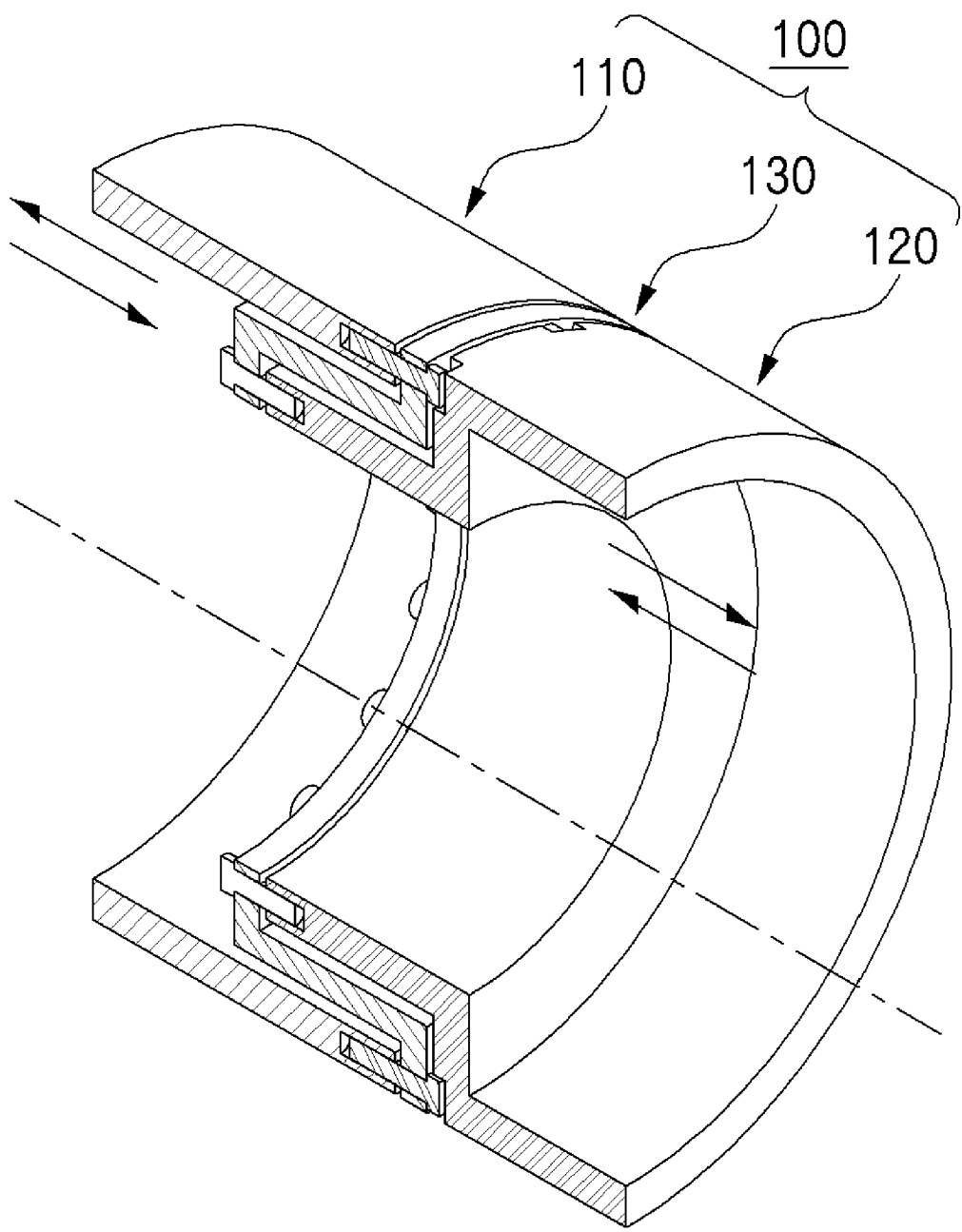
FIG. 3 is a perspective sectional view of FIG. 2.
Figure 4:
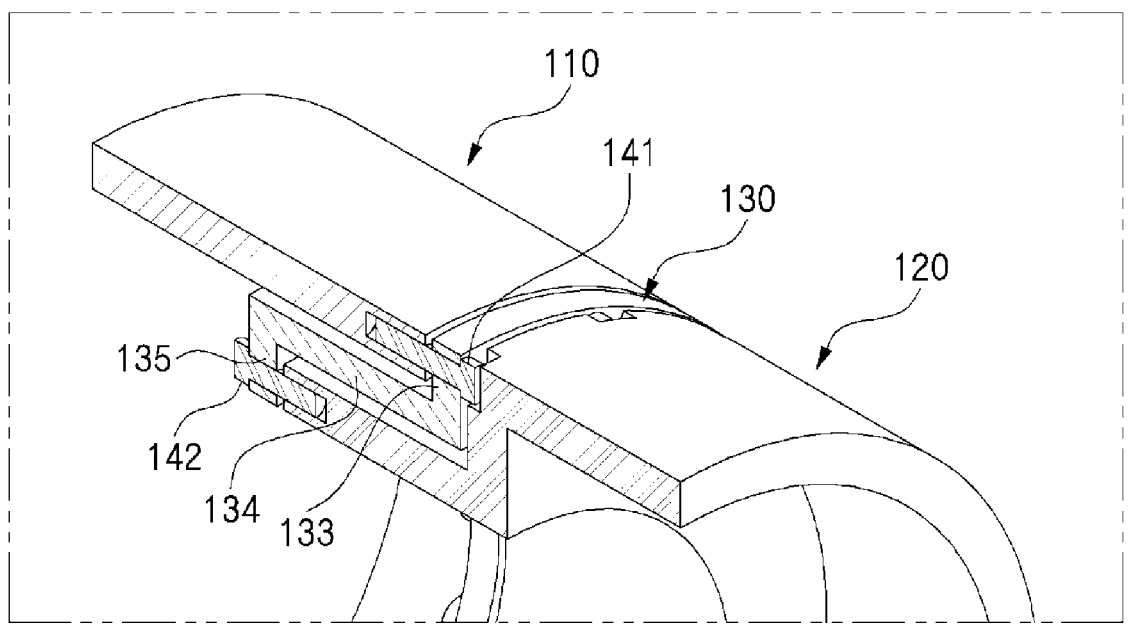
FIG. 4 is a partial enlarged view of FIG. 3.
Figure 5:
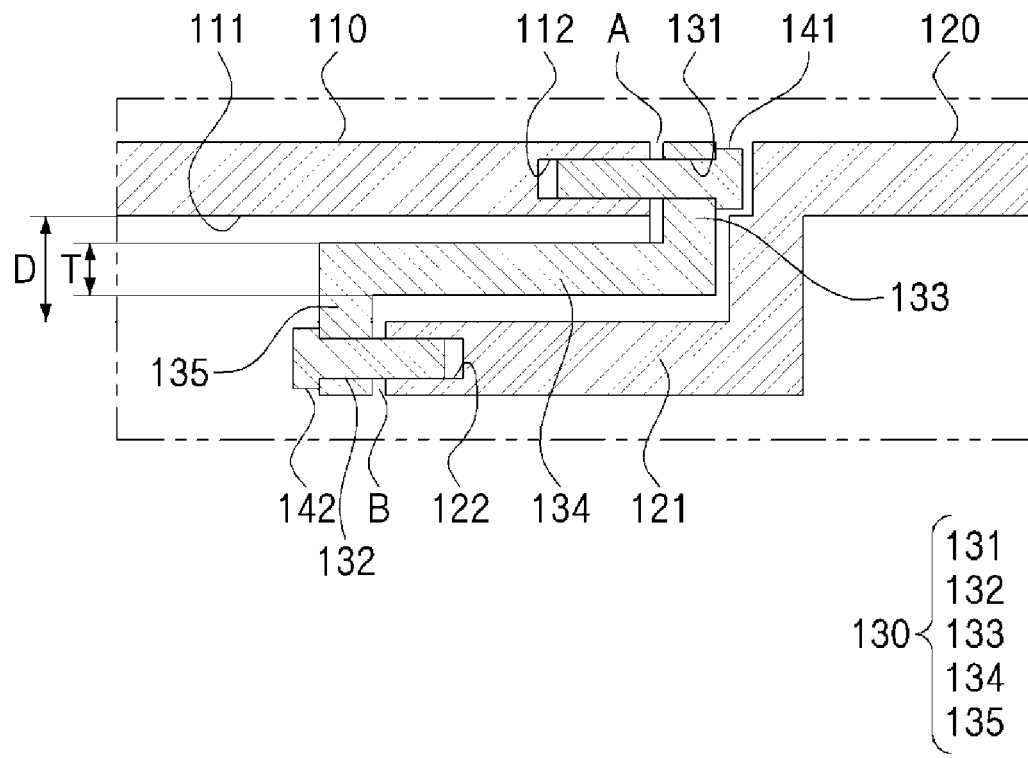
FIG. 5 is a partial enlarged view showing a first rotor, a second rotor, and a connecting member according to an embodiment of the present disclosure.

FIG. 2 is a sectional view partially showing a gas turbine rotor according to an embodiment of the present disclosure; and FIG. 3 is a perspective sectional view of FIG. 2. Further, FIG. 4 is a partial enlarged view of FIG. 3; and FIG. 5 is a partial enlarged view showing a first rotor, a second rotor, and a connecting member according to an embodiment of the present disclosure.

Referring to the drawings, a gas turbine rotor 100 according to the embodiment, which rotates with a compressor and a turbine blade mounted to an outer circumferential surface thereof, may include a first rotor 110, a second rotor 120, and a connecting member 130 having predetermined structures.

Since the connecting member 130 according to the embodiment is made of a material having a thermal expansion coefficient different from that of both the first rotor 110 and the second rotor 120, it is possible to provide a gas turbine rotor and a gas turbine having the same, in which an axial interval between the first rotor 110 and the second rotor 120 is changed by thermal expansion at the start of the gas turbine, so an axial length of the entire gas turbine rotor 100 can be adjusted efficiently, and as a result, a radial clearance of the turbine can be adjusted.

Hereinbelow, each component constituting the gas turbine rotor 100 according to the embodiment will be described in detail, with reference to the accompanying drawings.

The first rotor 110 according to the embodiment is in a shaft shape extending by a predetermined length in an axial direction, and is provided with an insertion hole 111 at an end thereof to allow an insertion part 121 of the second rotor 120 to be inserted therein.

The second rotor 120 is formed in a shaft shape extending by a predetermined length in the axial direction, and is provided with the insertion part 121 extending by a predetermined length at an end thereof and corresponding to the insertion hole 111 provided in the first rotor 110. That is, the insertion part 121 is inserted into the insertion hole 111.

Further, the connecting member 130 is mounted between the insertion hole 111 of the first rotor 110 and the insertion part 121 of the second rotor 120 to connect the first rotor 110 and the second rotor 120 together, and is made of a material having a thermal expansion coefficient different from a thermal expansion coefficient of both the first rotor 110 and the second rotor 120.

As shown in FIGS. 4 and 5, the first rotor 110 and the second rotor 120 are coupled together through the connecting member 130.

To be more specific, the first rotor 110 is provided with bolt holes 112 at the end thereof along an outer circumferential surface to be spaced apart from each other at predetermined intervals, and the connecting member 130 is provided with through-holes 131 at locations on a side surface thereof corresponding to the bolt holes 112, with the end of the first rotor 110 coupled thereto. Here, the first rotor 110 and the connecting member 130 are bolted to each other by using the bolt holes 112 and the through-holes 131.

Further, the insertion part 121 is provided with bolt holes 122 at an end thereof along an outer circumferential surface to be spaced apart from each other at predetermined intervals, and the connecting member 130 is provided with through-holes 132 at locations on a side surface thereof corresponding to the bolt holes 122, with the end of the insertion part 121 coupled thereto. Also here, the second rotor 120 and the connecting member 130 are bolted to each other by using the bolt holes 122 and the through-holes 132.

In this case, according to the present disclosure, by using the bolt holes 112 and 122 formed in the first rotor 110 and the second rotor 120, and the through-holes 131 and 132 formed in the connecting member 130, the connecting member 130 is firmly and stably bolted to both the first rotor 110 and the second rotor 120, so it is possible to achieve a stable structure of the gas turbine rotor 100.

In some cases, the connecting member 130 according to the embodiment may be configured such that at least two materials having different thermal expansion coefficients are arranged in a predetermined pattern. Here, the pattern may be appropriately changed according to the designer's intention. For example, since the material around the through-holes 131 connected to the first rotor 110 and the material around the through-holes 132 connected to the second rotor 120 are made to have different thermal expansion coefficients, it is possible to differently adjust the length change in the first rotor 110 and the length change in the second rotor 120. If the first rotor 110 disposed toward a compressor and the material of the connecting member 130 adjacent to the first rotor 110 have a thermal expansion coefficient larger than that of the other material, at the beginning of the starting phase of the gas turbine, the radial clearance for the compressor blade may be adjusted to be larger and the radial clearance for the turbine blade may be adjusted smaller.

In this case, according to the present disclosure, since the connecting member 130 is made of at least two materials having different thermal expansion coefficients according to purpose and order, it is possible to provide a gas turbine rotor and a gas turbine having the same, in which the axial length of the gas turbine rotor is locally and differently adjusted according to the temperature rise of the gas turbine rotor at the starting phase of the gas turbine, whereby the radial clearance of the turbine can be adjusted.

Meanwhile, as shown in FIGS. 4 and 5, the connecting member 130 according to the embodiment may include a first connecting part 133, an extension part 134, and a second connecting part 135 having predetermined structures.

To be more specific, the first connecting part 133 and the second connecting part 135 may be integrally provided at opposite ends of the extension part 134 and may be configured to be bent in opposite directions and extend by a predetermined length.

Here, the extension part 134 integrally connecting the first connecting part 133 and the second connecting part 135 to each other may have a structure corresponding to an outer circumferential surface of the insertion part 121 by extending by a predetermined length.

Meanwhile, it is preferred that an inner circumferential surface of the insertion hole 111 and the outer circumferential surface of the insertion part 121 be spaced apart from each other at a predetermined interval in consideration of a thickness T of the extension part 134. For example, an interval D between the inner circumferential surface of the insertion hole 111 and the outer circumferential surface of the insertion part 121 may range from 100% to 110% of the thickness T of the extension part 134.

The interval D between the inner circumferential surface of the insertion hole 111 and the outer circumferential surface of the insertion part 121 may be appropriately changed in consideration of the kind of the material constituting the connecting member 130 and the interval changed by the thermal expansion.

In this case, since the interval between the inner circumferential surface of the insertion hole 111 and the outer circumferential surface of the insertion part 121 is limited to a predetermined range relative to the thickness of the thickness T of the extension part 134, it is possible to more precisely and reliably adjust the entire length of the gas turbine rotor 100 according to the thermal deformation of the connecting member 130.

Meanwhile, the connecting member 130 according to the embodiment may have a cross-section in an annular shape having an outer diameter corresponding to outer diameters of the first rotor 110 and the second rotor 120.

Figure 9:
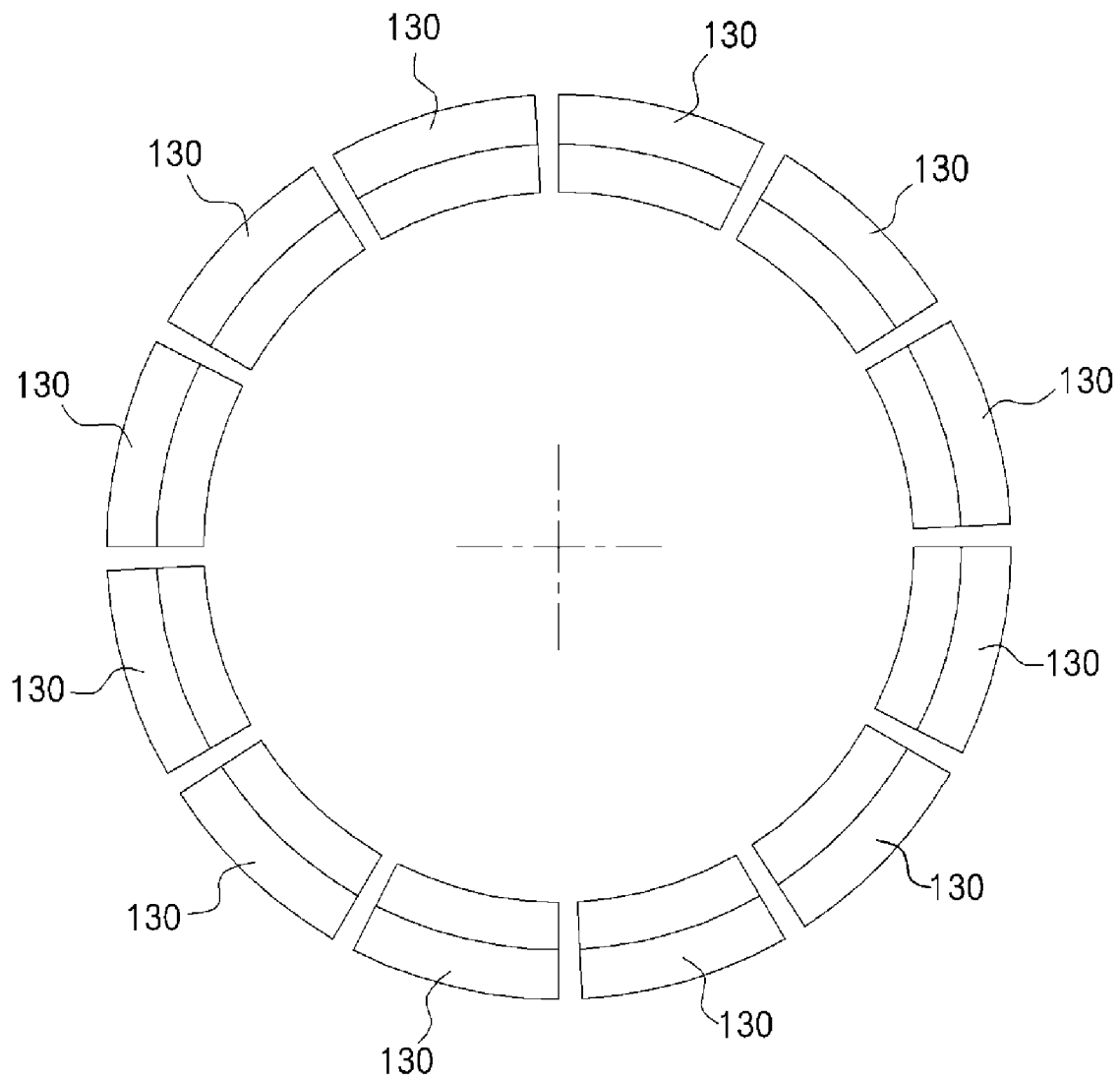
FIG. 9 is a front view showing a connecting member according to still another embodiment of the present disclosure.

In some cases, as shown in FIG. 9, the connecting member 130 constituted by a plurality of pieces may be used to connect the first rotor 110 and the second rotor 120 together.

To be more specific, as shown in FIG. 9, the connecting member 130 constituted by a plurality of pieces may be configured such that at least two connecting members are connected to each other to have a cross-section in an annular shape corresponding to outer diameters of the first rotor 110 and the second rotor 120.

The above embodiment is advantageous in that since the connecting member 130 can be manufactured in a small size and the weight thereof is easy to handle, the efficiency may be remarkably improved in manufacturing a gas turbine rotor.

Further, the extension part 134 according to the embodiment may be configured such that at least two materials having different thermal expansion coefficients are arranged in a predetermined pattern. Here, the pattern may be appropriately changed according to the designer's intention.

In some cases, both a contact surface A between the first rotor 110 and the connecting member 130 and a contact surface B between the second rotor 120 and the connecting member 130 may be coated with a heat transfer material.

In this case, it is possible to provide a gas turbine rotor and a gas turbine having the same, in which heat transfer is effectively induced according to the temperature rise of the gas turbine rotor at the starting phase of the gas turbine such that the length change of the connecting member 130 is actively induced, so the axial length of the gas turbine rotor can be adjusted, whereby the radial clearance of the turbine can be adjusted.

Figure 6:
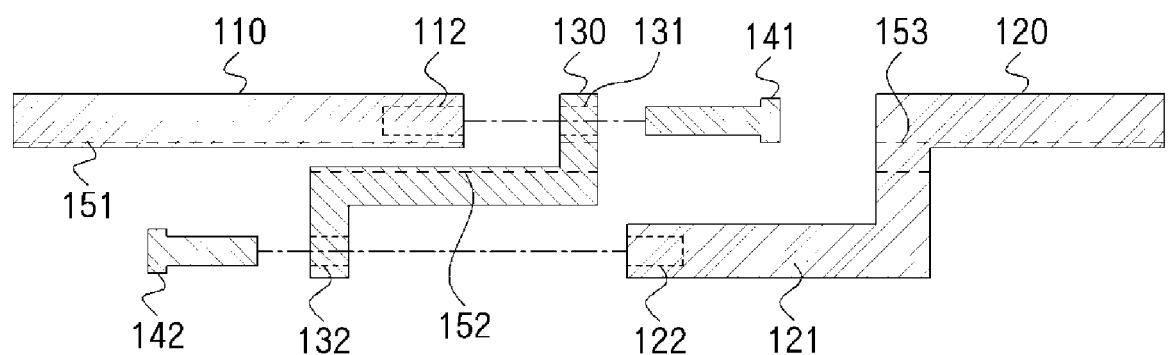
FIG. 6 is an exploded view showing a first rotor, a second rotor, and a connecting member according to another embodiment of the present disclosure.
Figure 7:
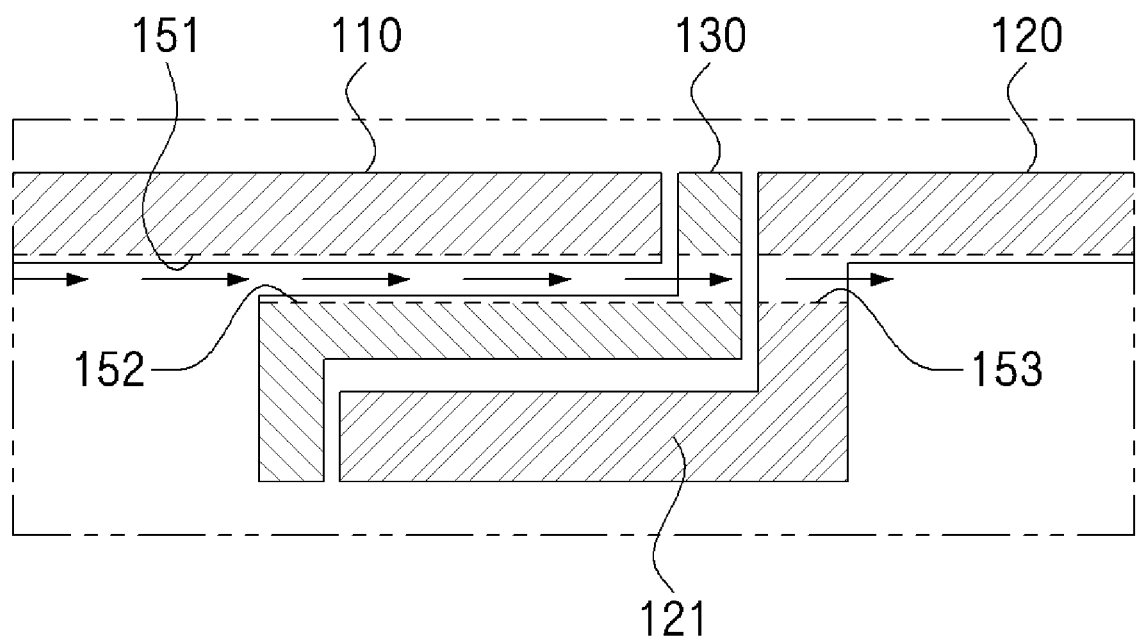
FIG. 7 is a partial enlarged view showing a state where the first rotor, the second rotor, and the connecting member shown in FIG. 6 are assembled.

FIG. 6 is an exploded view showing a first rotor 110, a second rotor 120, and a connecting member 130 according to another embodiment of the present disclosure; and FIG. 7 is a partial enlarged view showing a state where the first rotor 110, the second rotor 120, and the connecting member 130 shown in FIG. 6 are assembled.

Referring to the drawings, the first rotor 110 and the second rotor 120 according to the embodiment are provided therein with first passages 151 and 153, respectively, to allow cooling fluid to flow therethrough. Further, the connecting member 130 is provided therein with a second passage 152 communicating with the first passages 151 and 153. Here, it is preferred that the second passage 152 be provided in a direction parallel to an extension direction of the connecting member 130.

Figure 8:
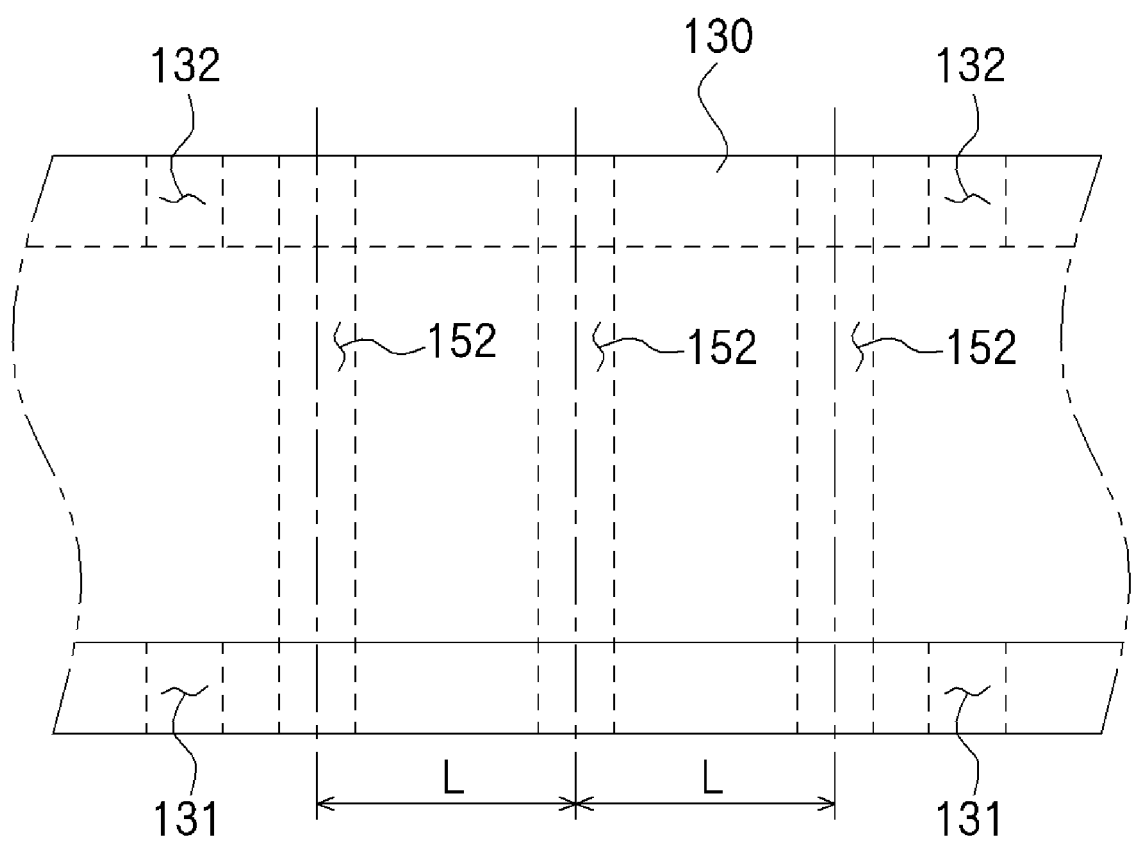
FIG. 8 is a plan view showing a connecting member according to a further embodiment of the present disclosure.

Preferably, as shown in FIG. 8, the second passage 152 may be provided in plural and spaced apart from each other at predetermined intervals.

Also in this case, according to the gas turbine rotor of the present disclosure, since the gas turbine rotor is provided with the first passages 151 and 153, and the second passage 152 having predetermined structures such that the cooling air flows therethrough, it is possible to easily adjust the axial length of the first rotor 110, the second rotor 120, and the connecting member 130 according to the thermal deformation.

The present disclosure further provides a gas turbine having the above described gas turbine rotor 100, in which the axial length of the gas turbine rotor is adjusted according to the temperature rise of the gas turbine rotor at the starting phase of the gas turbine, thereby adjusting a radial clearance of the turbine.

While the present disclosure has been described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present invention as defined by the appended claims.

In other words, the present disclosure is not limited to the exemplary embodiments nor to the above description, and those skilled in the art will appreciate that various modifications, additions and substitutions are possible, without departing from the scope and spirit of the invention.

What is claimed is:

1. A gas turbine rotor rotating with a compressor and a turbine blade mounted to an outer circumferential surface thereof, the gas turbine rotor comprising:

a first rotor formed in a shaft shape extending by a predetermined length in an axial direction, and provided with an insertion hole at an end of the first rotor;
a second rotor formed in a shaft shape extending by a predetermined length in the axial direction, and provided with an insertion part extending by a predetermined length at an end of the second rotor and corresponding to the insertion hole provided in the first rotor such that the insertion part is inserted into the insertion hole; and
a connecting member mounted between the insertion hole and the insertion part to connect the first rotor and the second rotor together, and made of a material having a thermal expansion coefficient different from a thermal expansion coefficient of both the first rotor and the second rotor,
wherein the connecting member includes:
a first connecting part coupled to the end of the first rotor,
a second connecting part coupled to the end of the second rotor; and
an extension part integrally connecting the first connecting part and the second connecting part which are bent in opposite directions and each extend by a predetermined length, and having a structure corresponding to an outer circumferential surface of the insertion part by extending by a predetermined length, the extension part being positioned between an inner circumferential surface of the insertion hole and the outer circumferential surface of the insertion part.

2. The gas turbine rotor of claim 1, wherein
the first rotor is provided with bolt holes at the end thereof along an outer circumferential surface to be spaced apart from each other at predetermined intervals,
the connecting member is provided with through-holes at locations on a side surface thereof corresponding to the bolt holes, with the end of the first rotor coupled thereto, and
the first rotor and the connecting member are bolted to each other by using the bolt holes and the through-holes.

3. The gas turbine rotor of claim 1, wherein
the insertion part is provided with bolt holes at an end thereof along an outer circumferential surface to be spaced apart from each other at predetermined intervals,
the connecting member is provided with through-holes at locations on a side surface thereof corresponding to the bolt holes, with the end of the insertion part coupled thereto, and
the second rotor and the connecting member are bolted to each other by using the bolt holes and the through-holes.

4. The gas turbine rotor of claim 1, wherein the connecting member is configured such that at least two materials having different thermal expansion coefficients are arranged in a predetermined pattern.

5. The gas turbine rotor of claim 1, wherein an interval between the inner circumferential surface of the insertion hole and the outer circumferential surface of the insertion part ranges from 100% to 110% of a thickness of the extension part.

6. The gas turbine rotor of claim 1, wherein the connecting member has a cross-section in an annular shape having an outer diameter corresponding to outer diameters of the first rotor and the second rotor.

7. The gas turbine rotor of claim 1, wherein the connecting member is configured such that at least two connecting members are connected to each other to have a cross-section in an annular shape corresponding to outer diameters of the first rotor and the second rotor.

8. The gas turbine rotor of claim 1, wherein the extension part is configured such that at least two materials having different thermal expansion coefficients are arranged in a predetermined pattern.

9. The gas turbine rotor of claim 1, wherein both a contact surface between the first rotor and the connecting member and a contact surface between the second rotor and the connecting member are coated with a heat transfer material.

10. The gas turbine rotor of claim 1, wherein each of the first rotor and the second rotor is provided with a first passage therein to allow cooling fluid to flow therethrough.

11. The gas turbine rotor of claim 10, wherein the connecting member is provided therein with a second passage communicating with the first passage.

12. The gas turbine rotor of claim 11, wherein the second passage is provided in a direction parallel to an extension direction of the connecting member.

13. The gas turbine rotor of claim 12, wherein the second passage is provided in plural to be spaced apart from each other at predetermined intervals.

14. A gas turbine comprising:
a compressor;
a gas turbine rotor rotating with the compressor; and
a turbine blade mounted to an outer circumferential surface of the gas turbine rotor,
wherein the gas turbine rotor includes:
a first rotor formed in a shaft shape extending by a predetermined length in an axial direction, and provided with an insertion hole at an end of the first rotor;
a second rotor formed in a shaft shape extending by a predetermined length in the axial direction, and provided with an insertion part extending by a predetermined length at an end of the second rotor and corresponding to the insertion hole provided in the first rotor such that the insertion part is inserted into the insertion hole; and
a connecting member mounted between the insertion hole and the insertion part to connect the first rotor and the second rotor together, and made of a material having a thermal expansion coefficient different from a thermal expansion coefficient of both the first rotor and the second rotor,
wherein the connecting member includes:
a first connecting part coupled to the end of the first rotor,
a second connecting part coupled to the end of the second rotor; and
an extension part integrally connecting the first connecting part and the second connecting part which are bent in opposite directions and each extend by a predetermined length, and having a structure corresponding to an outer circumferential surface of the insertion part by extending by a predetermined length, the extension part being positioned between an inner circumferential surface of the insertion hole and the outer circumferential surface of the insertion part.

15. The gas turbine of claim 14, wherein the connecting member has a cross-section in an annular shape having an outer diameter corresponding to outer diameters of the first rotor and the second rotor.

16. The gas turbine of claim 14, wherein the connecting member is configured such that at least two materials having different thermal expansion coefficients are arranged in a predetermined pattern.

17. The gas turbine of claim 14, wherein the connecting member is configured such that at least two connecting members are connected to each other to have a cross-section in an annular shape corresponding to outer diameters of the first rotor and the second rotor.

\* \* \* \* \*